(12) United States Patent  (10) Patent No.: US 7,177,532 B2
Roman et al.  (45) Date of Patent: Feb. 13, 2007

(54) DUAL VIDEO PLAYER FOR DISC JOCKEYS

(75) Inventors: Christopher Roman, Wrentham, MA (US); Brian Shim, Santa Monica, CA (US)

(73) Assignee: Numark Industries, LLC, Cumberland, RI (US)

( * ) Notice: Subject to any disclaimer, the term of this patent is extended or adjusted under 35 U.S.C. 154(b) by 169 days.

(21) Appl. No.: 11/007,083

(22) Filed: Dec. 8, 2004

(65) Prior Publication Data

US 2005/0141885 A1 Jun. 30, 2005

Related U.S. Application Data

(60) Provisional application No. 60/529,460, filed on Dec. 12, 2003.

(51) Int. Cl.
  *G11B 20/10* (2006.01)
  *G11B 15/52* (2006.01)
  *H04N 5/00* (2006.01)
  *H04B 1/00* (2006.01)

(52) U.S. Cl. .................. 386/126; 386/46; 386/95; 381/119; 360/71; 369/47.1

(58) Field of Classification Search ............... 369/2–5, 369/21, 47.1, 61, 62, 77.21, 79, 84; 360/15, 360/71, 85, 96.5; 381/58, 119; 386/46, 386/95, 124–126
See application file for complete search history.

(56) References Cited

U.S. PATENT DOCUMENTS

| | | | | |
|---|---|---|---|---|
| 5,796,538 | A * | 8/1998 | Ji et al. | 360/71 |
| 5,841,940 | A * | 11/1998 | Haines | 386/92 |
| 6,269,959 | B1 * | 8/2001 | Haworth | 211/26 |
| 6,542,695 | B1 * | 4/2003 | Akiba et al. | 386/125 |
| 6,545,953 | B1 * | 4/2003 | Herbert | 369/4 |
| 6,573,819 | B1 * | 6/2003 | Oshima et al. | 386/111 |
| 2003/0206711 | A1 * | 11/2003 | Berkheimer et al. | 386/46 |
| 2004/0228605 | A1 * | 11/2004 | Quan et al. | 386/46 |

* cited by examiner

*Primary Examiner*—Thai Q. Tran
*Assistant Examiner*—Mishawn Dunn
(74) *Attorney, Agent, or Firm*—Barlow, Josephs & Holmes, Ltd.

(57) ABSTRACT

The video player for disc jockeys has a playback unit (100) and a control unit (200) in separate housings (102, 202). The playback unit has two video drives (110, 112) contained therein. Each drive (110, 112) has a signal. The control unit has two user interfaces (210, 212) to control the video drives (110, 112) and selectively mix the signals.

36 Claims, 6 Drawing Sheets

DUAL VIDEO PLAYER FOR DISC JOCKEYS

CROSS-REFERENCE TO RELATED APPLICATION

This application claims priority to earlier filed U.S. Provisional Application Ser. No. 60/529,460, filed Dec. 12, 2003, the contents of which are incorporated herein by reference.

BACKGROUND OF THE INVENTION

This present invention relates generally to disc jockey equipment and more specifically to video players for disc jockeys. Video players and DVD players have been known in the art for quite some time, however, no DVD player unit on the market exists that has been designed with the disc jockey in mind. Disc jockeys are expanding their repertoire from music alone to performances incorporating video clips. Therefore, there is a perceived need for a video player unit designed for the disc jockey.

Moreover, because disc jockeys must be able to arrange their performance on the fly, the video equipment must include two video sources to allow the disc jockey to play media form one unit for his audience while simultaneously load and ready for play media in a second video player unit. The video equipment must also have the ability to switch between the video signals of the two video players to facilitate a seamless performance for the audience. Also, two video sources are commonly mixed to generate unique visual effects.

Video sources are typically displayed using video players, such as DVD optical drives. However, these consumer video player units on the market currently lack important features for disc jockeys. First, the units are not built ruggedly enough for transportation between performances. Second, the units lack a second video player unit and often lack critical features to a disc jockey such as being able to set "cue" and "loop points" to allow replay of segments of video and audio. Third, the units lack the ability to immediately play media without any pause due to latency problems in the playback device. Fourth and most importantly, the consumer units lack the ability to synchronize the playback of dual sources of video to enable seamless transition from one video signal to the other.

Additionally, the video player unit must be easy to use for the disc jockey so he or she may concentrate on the content of the performance rather than on the operation of the equipment.

SUMMARY OF THE INVENTION

The present invention provides a custom video player device that solves the deficiencies of the prior art. In a preferred embodiment of the invention, dual video drives in a single rugged chassis are provided with easy to use and comprehensive playback features that the modern disc jockey needs to have an exciting performance.

The video player includes a first housing and a second housing. The first housing has a control unit contained therein. The control unit has a first interconnection, a second interconnection. A first user interface, having a selectable setting, is connected to the control unit and is in control of the first interconnection. A second user interface, having a selectable setting, is also connected to the control unit and is in control of the second interconnection. The second housing has a first video drive and a second video drive, and an output contained therein. The first video drive has a first video signal and is connected to the first interconnection. Operation of the first video drive is controlled by the control unit via the first user interface and the first interconnection. The second video player has a second video signal and is connected to the second interconnection. Operation of the second video player is controlled by the control unit via the second user interface and the second interconnection. The first video signal and the second video signal are selectively mixed and routed through the output of the second housing according to the respective settings of the first user interface and the second user interface.

Accordingly, among the objects of the instant invention is to provide a video player having a video playback unit with dual video drives for providing two independent video sources, and a control unit connected to the video playback unit. The control unit has two interfaces to control each of the video players in the playback unit, and the interfaces are arranged substantially in a format that is particularly well suited for use by disc jockeys.

Another object of the instant invention is to provide a dual video player capable of reading DVD optical media.

Yet, another object of the instant invention is to provide a dual video player capable of reading CD optical media.

Yet, another object of the instant invention is to provide a dual video player capable of reading MP3 format.

Yet, another object of the instant invention is to provide a dual video player having functions to set "cue" and "loop points" to facilitate seamless looping of audio and video.

Yet, another object of the instant invention is to provide a dual video player having pitch-bend functions to enable the disc jockey to synchronize the video playback between the two video players.

Yet, another object of the instant invention is to provide a dual video player where the video playback and control units are in separate rack-mountable housings.

Yet, another object of the instant invention is to provide a dual video player wherein the playback of video is immediate upon activating the play controls of the device.

Yet, another object of the instant invention is to provide a dual video player that is compatible with NTSC and PAL television systems.

BRIEF DESCRIPTION OF THE DRAWINGS

These and other features, aspects, and advantages of the present invention will become better understood with reference to the following description, appended claims, and accompanying drawings where:

DESCRIPTION OF THE PREFERRED EMBODIMENT

Figure 1:
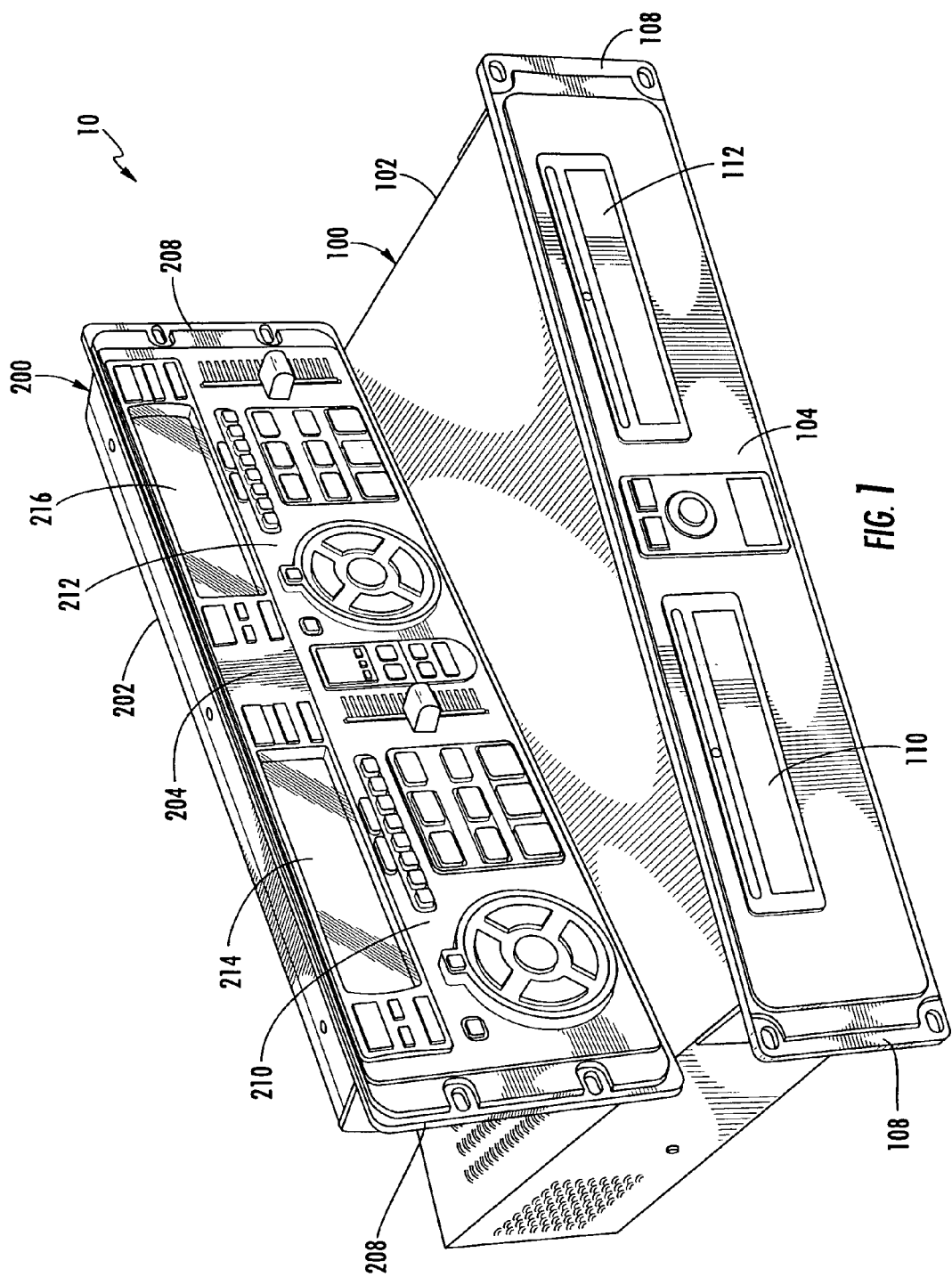
FIG. 1 is a perspective view of the preferred embodiment of the instant invention.
Figure 2:
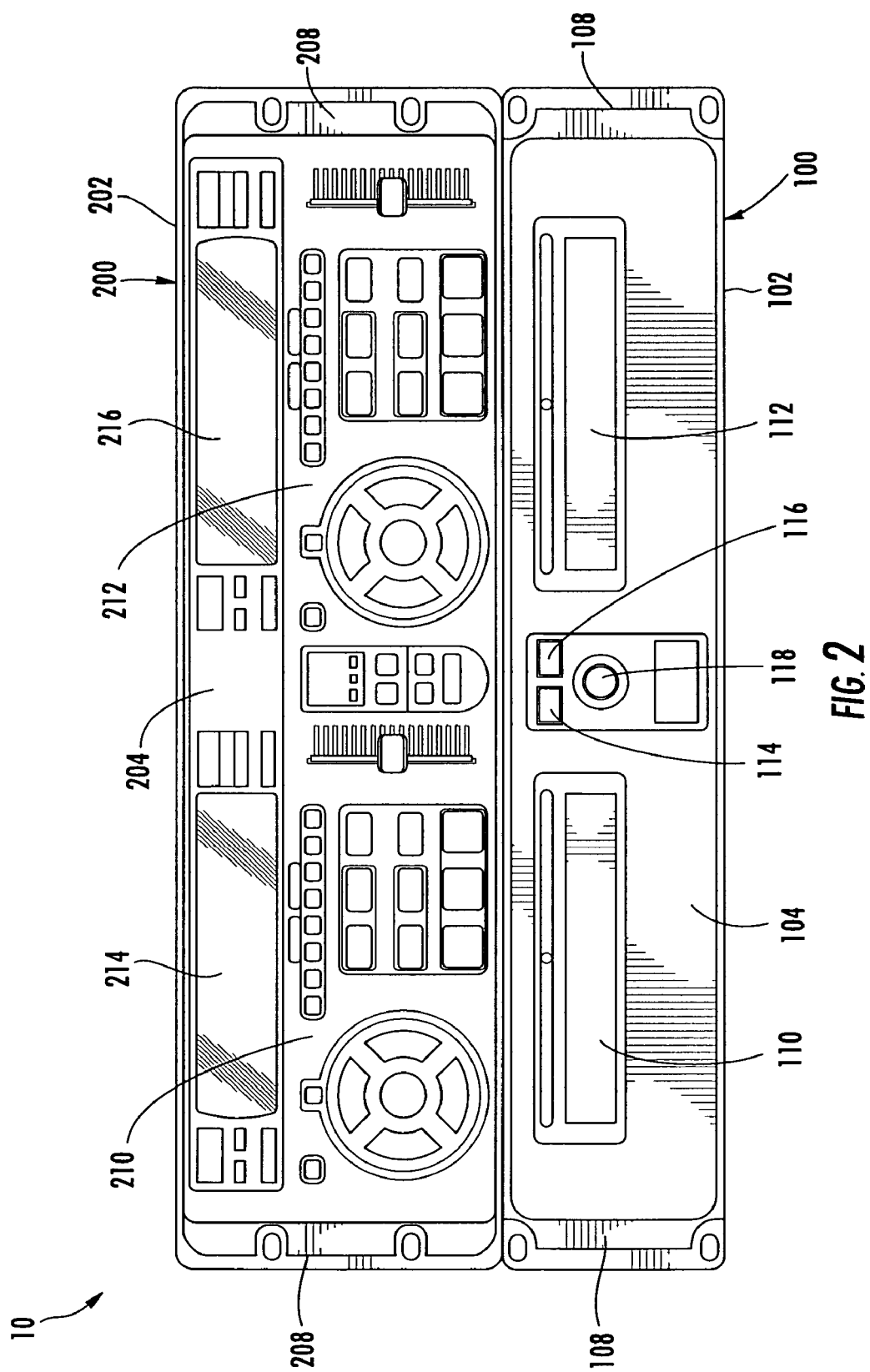
FIG. 2 is a front view of the preferred embodiment of the instant invention.
Figure 3:
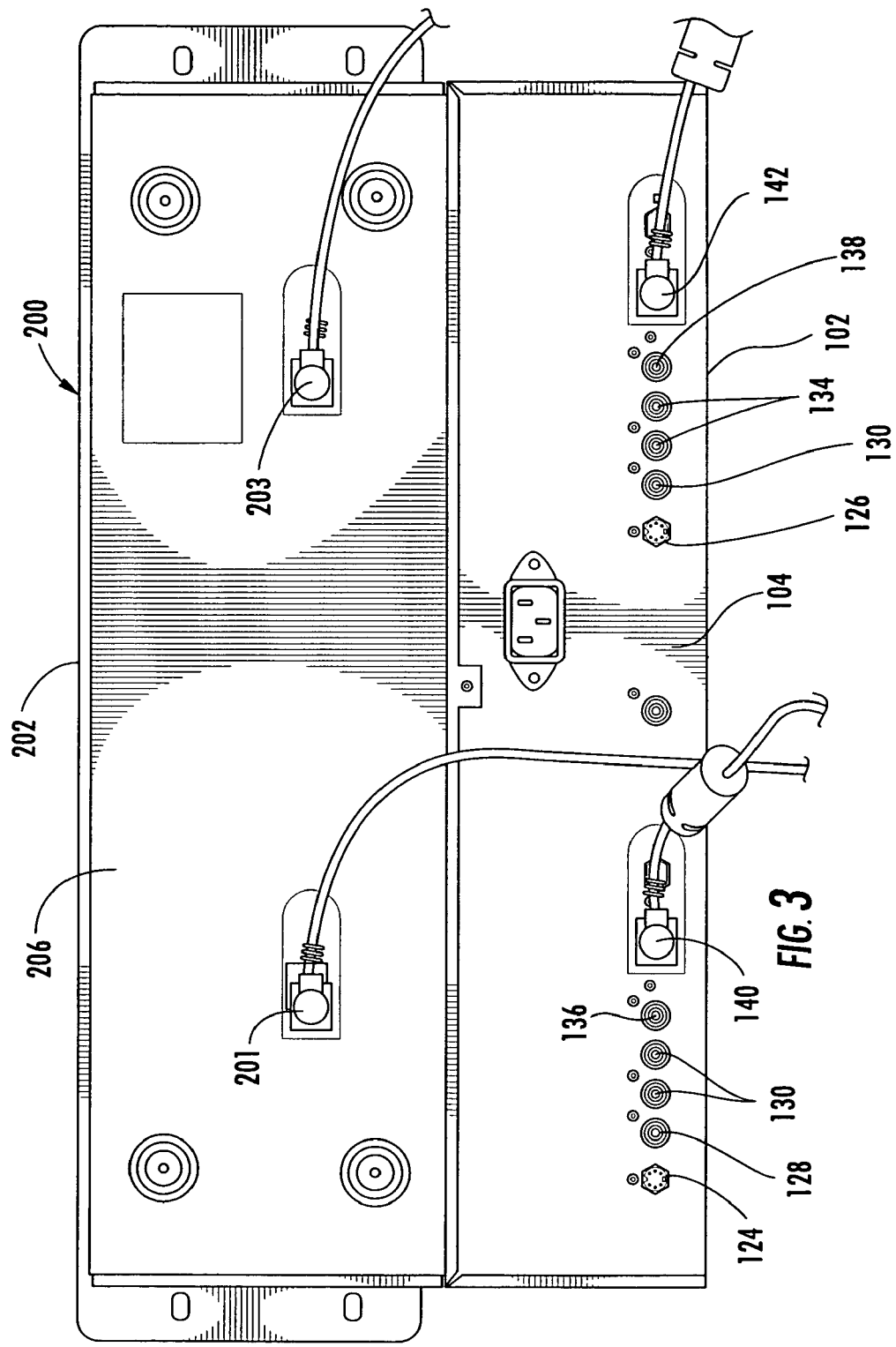
FIG. 3 is a rear view of the preferred embodiment of the instant invention.

Referring now to the figures, the preferred embodiment of the present invention is shown generally in FIGS. 1–3 at 10.

As will hereinafter be more fully described, the present invention is a dual video player for disc jockeys having a video playback unit 100 and a control unit 200. The playback unit has a first video drive 110 and a second video drive 112. The control unit 200 is connected to the playback unit 100 and controls the operation thereof. The control unit has two interfaces 210, 212 to allow independent control of each of the video drives 110, 112. The interfaces 210, 212 are arranged substantially in a format for ease of use by disc jockeys. In particular, the video drives 110, 112 are positioned side-by-side in a single housing 202 with displays positioned proximal thereto with pitch controls included for easy mixing of the outputs of the video drives 110, 112.

The playback unit 100 of the present invention has playback housing 102 with a front and a rear panel 104, 106. Extending from the edges of the playback housing are rack mounts 108. The rack mounts 108 and playback housing 102 are configured so that the playback unit 100 is mountable within a standard nineteen-inch rack, which disc jockeys commonly use. Within the housing of the playback unit 100 are a first and second video drives 110, 112, which are preferably DVD optical drives, but could be other removable-media type video drives such as VCD and 5VCD compatible optical drives. The first and second video drives 110, 112 could also be CD+G format compatible to facilitate Karaoke performances. It should be understood that video is meant to include associated audio, if desired.

The appropriate media (e.g. DVD, VCD, 5VCD, or CD+G discs) is loaded into one of the video drives 110, 112 through the front panel 104 of the playback unit 100 by activating the appropriate first and second eject controls 114, 116, which are located on the front panel 104 and between the first and second video drives 110, 112. To turn the dual video player 10 on and off, a power switch 118 is located on the front panel 104 of the playback unit 100 and just below the eject controls 114, 116.

Another unique feature of the video player 10 is the ability for the system to be upgraded by using the video drives 110, 112. The disc jockey loads media pre-loaded with an upgrade package into the video drives 110, 112 and then the video player 10 will automatically detect and install the upgrade. The disc jockey may obtain an upgrade either by downloading it through the internet and storing it on appropriate media, obtaining a copy from a distributor, or ordering it direct from the manufacturer.

Referring now to FIG. 3, the rear panel 106 of the playback unit 100 includes a number of connectors including a power input 120, master video output 122, a first and second S-video outputs 124, 126, a first and second composite video outputs 128, 130, a first and second RCA audio outputs 132, 134, a first and second coaxial digital audio outputs 136, 138, and a first and second control connectors 140, 142. Collectively, the outputs 122, 124, 126, 128, 130, 132, 134, 136, 138 mentioned above, are all internally connected to the respective video drive 110, 112. The power input 120 is connected to a power source (not shown) via a standard power cable (not shown) commonly used for consumer electronic devices. The first and second control connectors 140, 142 are connected to the control unit 200, described in more detail below, to enable the control unit 200 to operate the playback unit 100. The digital audio outputs 136, 138 are also capable of transmitting raw output in addition to digital output, such as Dolby 5.1 audio, depending on the audio source.

Referring back now to FIGS. 1–3, the control unit 200 of the present invention has a control unit housing 202 with a front and a rear panel 204, 206. Extending from the edges of the control unit housing 202 are rack mounts 208. The rack mounts 208 and control unit housing 202 are configured so that the control unit 200 is mountable within a standard nineteen-inch rack, which disc jockeys commonly use. The control unit has a first and a second interfaces 210, 212 located on the front panel 204. Each interface 210, 212 independently controls a corresponding video drive 110, 112 of the playback unit 100 via a number of controls that are arranged in substantially the same format as the other interface 210, 212. Each interface also has a display 214, 216, described in more detail below, to inform the disc jockey of operation statistics, modes and content of the dual video player 10. On the rear panel 206 of the control unit housing 202 of the control unit 200, are first and second control connectors 201, 203. The first and second control connectors 201, 203 are connected to the respective first and second control connectors 140, 142 on the rear panel 106 of the playback unit housing 102 of the playback unit 100 via a pair of control cables (not shown).

Figure 4:
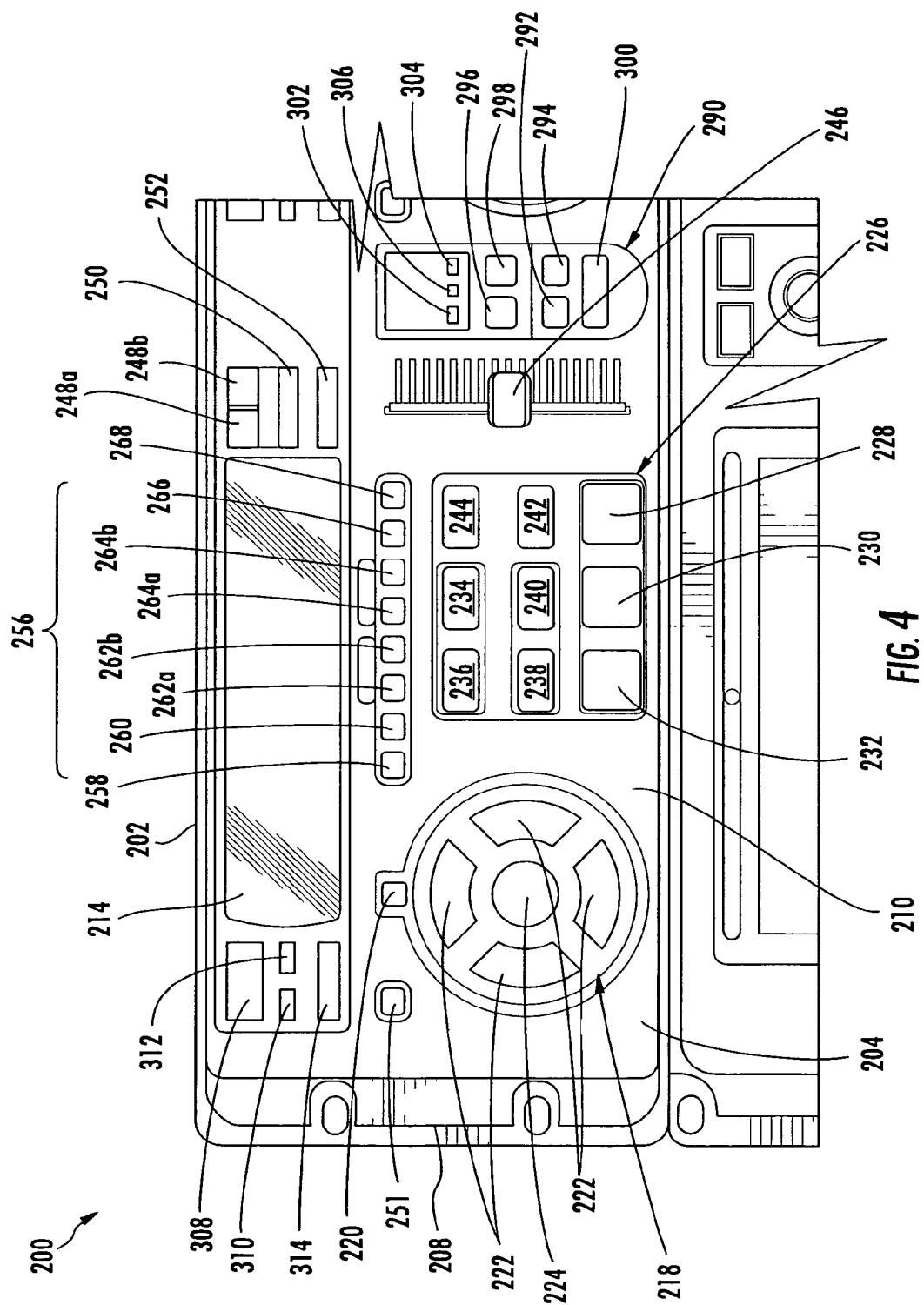
FIG. 4 is a close-up front view of the first interface of the instant invention of FIG. 1.

Referring now to FIG. 4, a close-up view of the first interface is 210 shown and will be discussed in detail. It is to be understood, however, that this discussion is equally applicable to the second interface 212 and is merely explained only once as a matter of convenience. The first interface 210 has a set of menu navigation controls 218 including a menu control 220, arrow controls 222 and an enter control 224. The menu navigation controls 218 enable the disc jockey to navigate through menus that may exist in video media content such as DVDs. Specifically, the menu control 220 activates the menu section of a DVD, for compatible DVDs. The adjacent arrow controls 222 enable the disc jockey to navigate through the menu to find the content he or she wishes to view. Typically, such content is organized according to track and chapter. Activation of the enter control 224 allows selection of the content for viewing. The arrow controls 224 also have the additional functions of adjusting the viewable portion of the video content that has been magnified or "zoomed," editing and creating play lists, and setting the dual video player's 10 settings. These functions will be more fully described below.

Also, on the first interface 210 of the control unit 200 are a set of playback controls 226. The playback controls 226 include play 228, pause 230, cue 232, fast-forward 234, rewind 236, next track 238, previous track 240, slow motion 242, and program 244 controls. Each of the identified playback controls 226 operates the first video drive 110 of the playback unit 100 according to its namesake. Accordingly, the play control 228 starts playback of video on the first video drive 110 and the pause control 230 pauses playback of video on the first video drive 110. The play and pause controls 228, 230 also have the function of setting an initial cue point (not shown) within the video playback of the first video drive 110. During playback, the cue control 232 will return the video playback to the last cue point set by either the play or pause controls 228, 230. The fast-forward and the rewind controls 234, 236 start playback of video at high speed either in forward or reverse play, respectively. Activating either the fast-forward or the rewind controls 234, 236 repeatedly will cycle through playback speeds of X2, X4, X8, X16, and X32. Activating either control 234, 236 while set at speed X32 will restart the cycle at the beginning. The slow motion control 242, which slows forward playback of the first video drive 110, can be cycled through four speed settings. The next track and previous track controls 238, 240 advance forward or backward by one track or chapter the playback of video from the first video drive 110. The program control 244 activates a menu where the disc jockey can use the menu navigation controls 218 to reorder the order of play of the tracks and chapters on media within the first video drive 110.

The first interface 210 also has a pitch fader 246 for fine adjustment of the playback pitch/speed. This feature is incredibly important to the performance of the disc jockey because it enables him or her, when used in conjunction with the other pitch controls, to synchronize the tempo of the playback of the first and second video drives 110, 112 with each other. Synchronizing the tempo allows the disc jockey to seamlessly switch from the playback of first video drive 110 to playback from the second video drive 112 and vice versa.

Complimentary to the pitch fader 246 are the pitch bend control 248a, 248b, and pitch activation control 250. The pitch activation control 250 disables and enables the pitch fader 246 and the pitch bend control 248a, 248b. This keeps the disc jockey from accidentally bumping the pitch fader 246 or the pitch bend control 248a, 248b during performance after he or she has already selected the desired settings. The pitch bend control 248a, 248b momentarily increases or decreases, as desired, the tempo of the playback of the first video drive 110. This enables the disc jockey, once he or she has synchronized the tempo of the playback of both video drives 110, 112 using the pitch fader 246, to match the bass beats of both video drives 110, 112.

Just below the pitch activation 250 is the loop control 252. When activated a first time during playback, the loop control 252 sets a loop-start point. Activating the loop control 252 a second time simultaneously sets a loop-end point and immediately restarts playback at the loop-start point. The video playback will then continuously play between the loop-start and loop-end points until the loop control 252 is activated a third time.

The first interface 210 also has a setup control 254, which activates a menu (not shown) where the disc jockey can set equipment settings and parameters using the menu navigation controls 218. The setup menu is split into several sub-menus including language setup, screen setup, audio setup, custom setup features and settings (including a parental lock feature). These features are standard on most consumer electronic devices and are not critical to the present invention. Therefore, they will not be discussed in detail.

The first interface 210 also has a set of function controls 256. The function controls 256 include title 258, subtitle 260, volume adjust 262a, 262b, key adjust 264a, 264b, angle 266, and zoom 268 controls. The title function control 258 activates the title menu content of a DVD if such content exists. Similarly, the subtitle function control 260 activates any subtitle content on subtitle compatible DVDs. The volume adjust control 262a, 262b adjusts the output volume up or down as desired. The key adjust control 264a, 264b adjusts the key of the audio up or down as desired for compatible DVDs. The angle function control 266 cycles through multiple angles of compatible DVDs. Finally, the zoom function control 268 allows the picture to be enlarged by a factor of X2 or X4. Activating the zoom function control 268 multiple times cycles through these choices.

Figure 5:
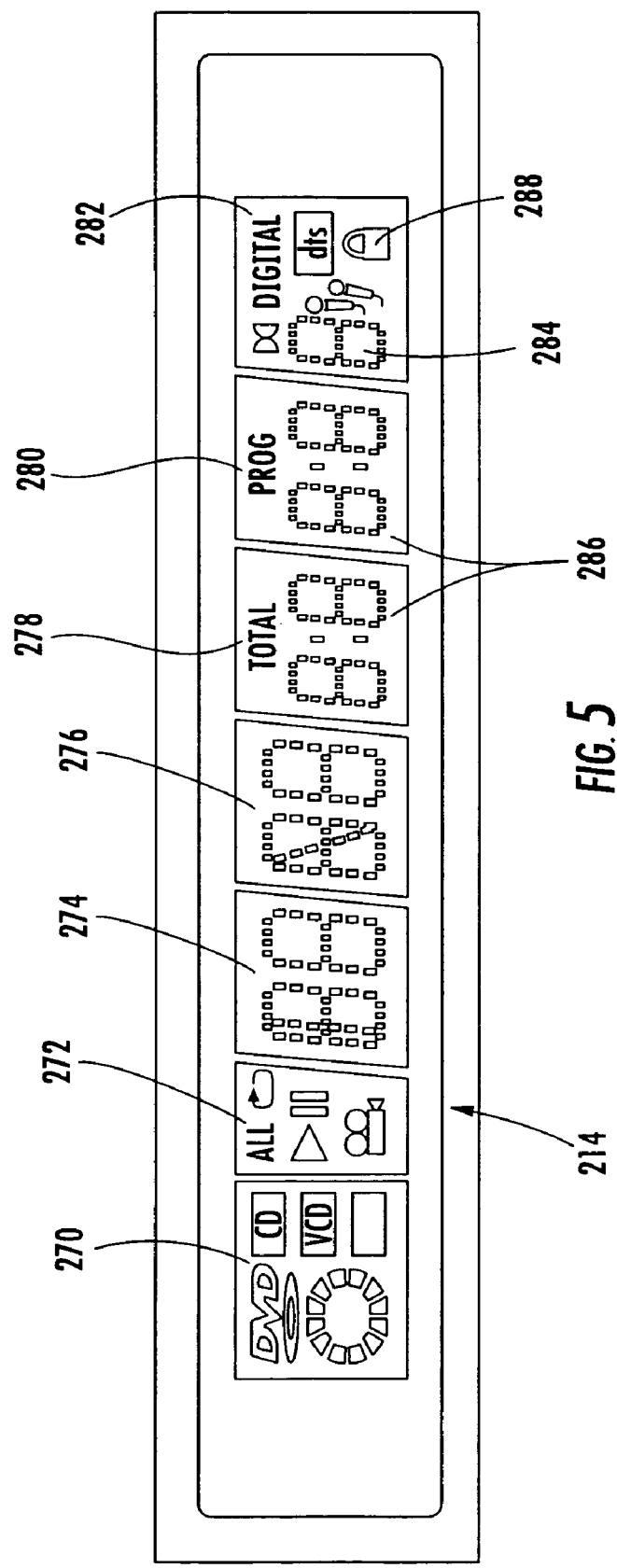
FIG. 5 is a close-up view of the display of the instant invention of FIG. 1.

Referring now to FIG. 5, located on the first interface is a first display 214, which displays information to the disc jockey about the current settings of the dual video player 10 and media being played in the playback unit 100. The first display 214 and second display 216 are identical in all respects with the exception that the first display 214 displays relevant statistics and settings of the first video drive 110, and the second display 216 does likewise for the second video drive 112. Therefore, only the first display 214 will be described solely as a matter of convenience and it is to be understood that this discussion is equally applicable to the second display 216.

The first display 214 has a number of indicators including a media type 270, play mode 272, title number 274, chapter/track number 276, total 278, program 280, Dolby Digital/DTS 282, angle 284, elapsed time 286, and parental lock 288 indicators. The media type indicator 270 displays the type of media (e.g. DVD, CD, or VCD) in the first video drive 110. The play mode indicator 272 indicates if the first video drive 110 is playing or paused, and shows the repeat modes that are currently in use, if any. If the video drive 110 is stopped, the entire screen will display "STOP." The title number indicator 274 shows the title number of the current media being played. The chapter/track number indicator 276 shows the current chapter or track number. The total indicator 278 indicates if the time is the total elapsed time on the media or track/chapter. The program indicator 280 indicates is the dual video player 10 is currently in a set program. The Dolby Digital/DTS indicator 282 indicates if a compatible DVD has Dolby Digital or DTS audio enabled. The angle indicator 284 indicates if a separate angle is in use (as set by the angle function control 266 described above) while the media in playing. The elapsed time indicator 286 indicates the elapsed time for the media. Finally, the parental lock indicator 288 indicates if the parental locking feature is engaged as set through the custom setup features menu of the setup control 254.

Referring back to FIG. 4 now, located on the front panel 104 of the control unit 200 and between the interfaces 210, 212, is a master video switch 290 for controlling the output of the playback unit 100. The master video switch 290 is a critical component to the disc jockey because it enables him or her to select the video that will be displayed during the performance. Alternatively, the disc jockey can display a black screen instead of video. This feature is useful to the disc jockey because it allows the disc jockey to display nothing during the performance when the disc jockey needs to switch the media that is loaded in the video drives 110, 112, or when the disc jockey needs an intermission between sets. No other video player currently on the market incorporates such a video switch.

The master video switch 290 has a first and second output switch 292, 294, a first and second On Screen Display ("OSD") controls 296, 298, a blackout control 300, and three indicators (vid1 indicator 302, vid2 indicator 304, and a black indicator 306). Activating either the first or second output switch 292, 294 selects the first or second video drives 110, 112, respectively, to output through the master video output 116. Activating the blackout control 300 blacks out output of the master video output 116. The indicators vid1 302, vid2 304 and black 306, indicate which output control 292, 294, 300 has been selected for output through the master video output 116. The OSD controls 296, 298 suppress any text generated from the video drive 110, 112 themselves from displaying through the master video output 116. This is useful to a disc jockey to prevent the video drive's 110, 112 functions (e.g. play, pause, fast forward, rewind, etc.) from being displayed to the audience during the disc jockey's performance.

The first interface 210 also has an eject control 308, which ejects media from the first video drive 110 of the playback unit 100. This control is in addition to and functions the same as the eject control 114 located on the playback unit 100. This extra eject control 308 has been added for the convenience of the disc jockey.

The first interface 210 also has a random control 310, which when activated selects from among the available titles on the current media within the first video drive 110 at random. Once activated, titles will continually be selected at random. Activating the random control 310 a second time disables this feature and resumes normal sequential play.

The first interface 210 also has a repeat control 312 with four modes: disabled, chapter/track, title, and entire media. The repeat control enables continuous repeat play of either the entire media within the first video drive 110, the current title, or the current chapter/track. The disabled mode resumes normal play. Activating the repeat control 312 repeatedly cycles through the modes of play.

The first interface 210 also has a display control 314, which toggles the elapsed time indicator 286 to display the time elapsed in the track, the time remaining in the track, and the total time remaining. Activating the display control 314 repeatedly cycles through these display modes.

Figure 6:
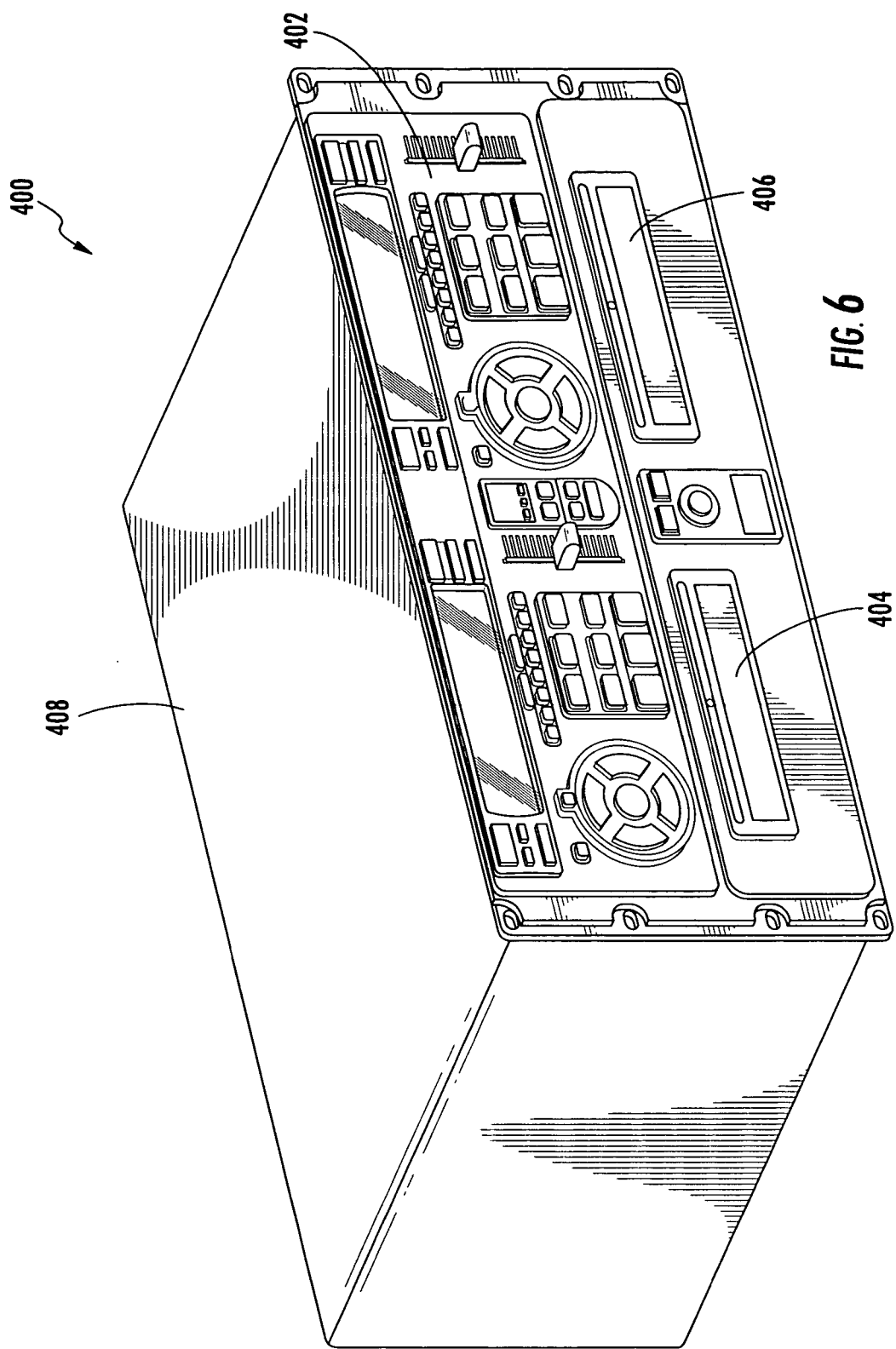
FIG. 6 is a perspective view of an alternative embodiment of the present invention.

FIG. 6 shows an alternative embodiment of a video player 400 of the present invention where the control unit 402, first video player 404, and second video player 406 are contained within a single main housing 408. It should be understood that the functionality of the video player 400 is the same as the video player 10 of the preferred embodiment of the present invention as discussed in detail above. Some users of the present invention may prefer a single housing 408 rather than the separate housings 102, 202 of the preferred embodiment 10. Similarly, monitor units for the disc jockey could be incorporated in the housing 202 the control unit 200 of the preferred embodiment or the main housing 408 of the alternative embodiment 400.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A video player for disc jockeys, comprising:
   a first housing;
   a control unit residing in the first housing; the control unit having a first interconnection, a second interconnection, a second interconnection;
   a first user interface, having a selectable setting, connected to the control unit and being in control of the first interconnection;
   a second user interface, having a selectable setting, connected to the control unit and being in control of the second interconnection;
   a second housing having a output;
   a first video player, having a first video signal, residing in the second housing and being connected to the first interconnection; operation of the first video player being controlled by the control unit via the first user interface and the first interconnection;
   a second video player, having a second video signal, residing in the second housing and being connected to the second interconnection; operation of the second video player being controlled by the control unit via the second user interface and the second interconnection;
   the first video signal and the second video signal being selectively mixed controlled and routed through the output of the second housing according to the respective settings of the first user interface and the second user interface;
   said first user interface further comprising a first pitch control unit for adjusting the pitch of the first video signal and a first pitch bend control that momentarily changes the pitch of the first video signal;
   said second user interface further comprising a second pitch control unit for adjusting the pitch of the second video signal a second pitch bend control that momentarily changes the pitch of the second video signal; and
   the first pitch control, the second pitch control, the first pitch bend control and second pitch bend control each being individually adjustable to enable the respective pitches of the first video signal and the second video signal to match each other.

2. The video player of claim 1, wherein the first video drive and second video drive are DVD optical drives.

3. The video player of claim 1, further comprising:
   first rack mounts extending from the first housing; and
   second rack mounts extending form the second housing.

4. The video player of claim 1, further comprising means for seamlessly looping the first video signal.

5. The video player of claim 1, further comprising means for seamlessly looping the second video signal.

6. The video player of claim 1, further comprising means for cueing the first video signal to a desired playback position thereof.

7. The video player of claim 1, further comprising means for cueing the second video signal to a desired playback position thereof.

8. The video player of claim 1, further comprising means for selectively controlling the routing of the first video signal and the second video signal through the output of the second housing.

9. The video player of claim 1, further comprising a display capable of indicating characteristics of the first video signal and the second video signal.

10. The video player of claim 1, further comprising:
    a first display capable of indicating characteristics of the first video signal; and
    a second display capable of indicating characteristics of the second video signal.

11. A video player for disc jockeys, comprising:
    a playback unit having a first DVD optical drive and a second DVD optical drive, each DVD optical drive having a respective first video signal and second video signal;
    a control unit connected to the playback unit, the control unit having a first interface and a second interface to control the first DVD optical drive and second DVD optical drive and the respective first video signal and second video signal;
    said first interface further comprising a first pitch control for controlling the pitch of the first video signal and a first pitch bend control that momentarily changes the pitch of the first video signal;
    said second interface further comprising a second pitch control for controlling the pitch of the second video signal and a second pitch bend control that momentarily changes the pitch of the second video signal; and
    the first pitch control, the second pitch control, the first pitch bend control and second pitch bend control each being individually adjustable to enable the respective pitches of the first video signal and the second video signal to match each other.

12. The video player of claim 11, further comprising:
    a first housing containing the playback unit; and
    a second housing containing the control unit.

13. The video player of claim 12, further comprising first rack mounts extending from the first housing.

14. The video player of claim 12, further comprising second rack mounts extending from the second housing.

15. The video player of claim 11, wherein the first interface of the control unit further comprises means for seamlessly looping the first video signal of the first DVD optical drive.

16. The video player of claim 15, wherein the second interface of the control unit further comprises means for seamlessly looping the second video signal of the second DVD optical drive.

17. The video player of claim 11, wherein the control unit comprises a means for mixing the video signals of the first DVD optical drive and the second DVD optical drive.

18. The video player of claim 11, further comprising a first display indicating characteristics of the first video signal of the first DVD optical drive.

19. The video player of claim 11, further comprising a second display indicating characteristics of the second video signal of the second DVD optical drive.

20. A video player for disc jockeys, comprising: a main housing;
   a control unit residing in the main housing; the control unit having a first interconnection, a second interconnection, and an output;
   a first user interface, having a selectable setting, connected to the control unit and being in control of the first interconnection;
   a second user interface, having a selectable setting, connected to the control unit and being in control of the second interconnection;
   a first video drive, having a first video signal, residing in the main housing and being connected to the first interconnection; operation of the first video player being controlled by the control unit via the first user interface and the first interconnection;
   a second video drive, having a second video signal, residing in the main housing and being connected to the second interconnection; operation of the second video player being controlled by the control unit via the second user interface and the second interconnection;
   said first user interface further comprising a first pitch control for controlling the pitch of the first video signal and a first pitch bend control that momentarily changes the pitch of the first video signal;
   said second user interface further comprising a second pitch control for controlling the pitch of the second video signal and a second pitch bend control that momentarily changes the pitch of the second video signal; and
   the first pitch control, the second pitch control, the first pitch bend control and second pitch bend control each being individually adjustable to enable the respective pitches of the first video signal and the second video signal to match each other; and
   the first video signal and the second video signal being selectively mixed controlled and routed through the output of the control unit according to the respective settings of the first user interface and the second user interface.

21. The video player of claim 20, wherein the first video drive and second video drive are DVD optical drives.

22. The video player of claim 20, further comprising rack mounts extending from the main housing.

23. The video player of claim 20, further comprising means for seamlessly looping the first video signal.

24. The video player of claim 20, further comprising means for seamlessly looping the second video signal.

25. The video player of claim 20, further comprising means for cueing the first video signal to a desired playback position thereof.

26. The video player of claim 20, further comprising means for cueing the second video signal to a desired playback position thereof.

27. The video player of claim 20, further comprising means for selectively controlling the routing of the first video signal and the second video signal through the output of the control unit.

28. The video player of claim 20, further comprising a display capable of indicating characteristics of the first video signal and the second video signal.

29. The video player of claim 20, further comprising:
   a first display capable of indicating characteristics of the first video signal; and
   a second display capable of indicating characteristics of the second video signal.

30. A video player for disc jockeys, comprising:
   a first video player having a first video signal;
   a second video player having a second video signal;
   a control unit having video signal output;
   means for selectively routing the first video signal through the video signal output;
   means for selectively routing the second video signal through the video signal output.
   said control unit further comprising a first pitch control for controlling the pitch of the first video signal and a first pitch bend control that momentarily changes the pitch of the first video signal; and
   said control unit further comprising a second pitch control for controlling the pitch of the second video signal and a second pitch bend control that momentarily changes the pitch of the second video signal; and
   the first pitch control, the second pitch control, the first pitch bend control and second pitch bend control each being individually adjustable to enable the respective pitches of the first video signal and the second video signal to match each other.

31. The video player of claim 30, further comprising:
   video switching means for selectively routing the first video signal, the second video signal and no signal through the video signal output.

32. The video player of claim 30, wherein the first video player and the second video player are DVD optical drives.

33. The video player of claim 30, further comprising means for seamlessly looping the first video signal of the first video player.

34. The video player of claim 30, further comprising means for seamlessly looping the second video signal of the second video player.

35. The video player of claim 30, further comprising a first display indicating characteristics of the first video signal of the first video player.

36. The video player of claim 30, further comprising a second display indicating characteristics of the second video signal of the second video player.

* * * * *